June 29, 1937. R. K. STOUT 2,085,050
IMPROVED COMPASS MOUNT
Filed June 23, 1936
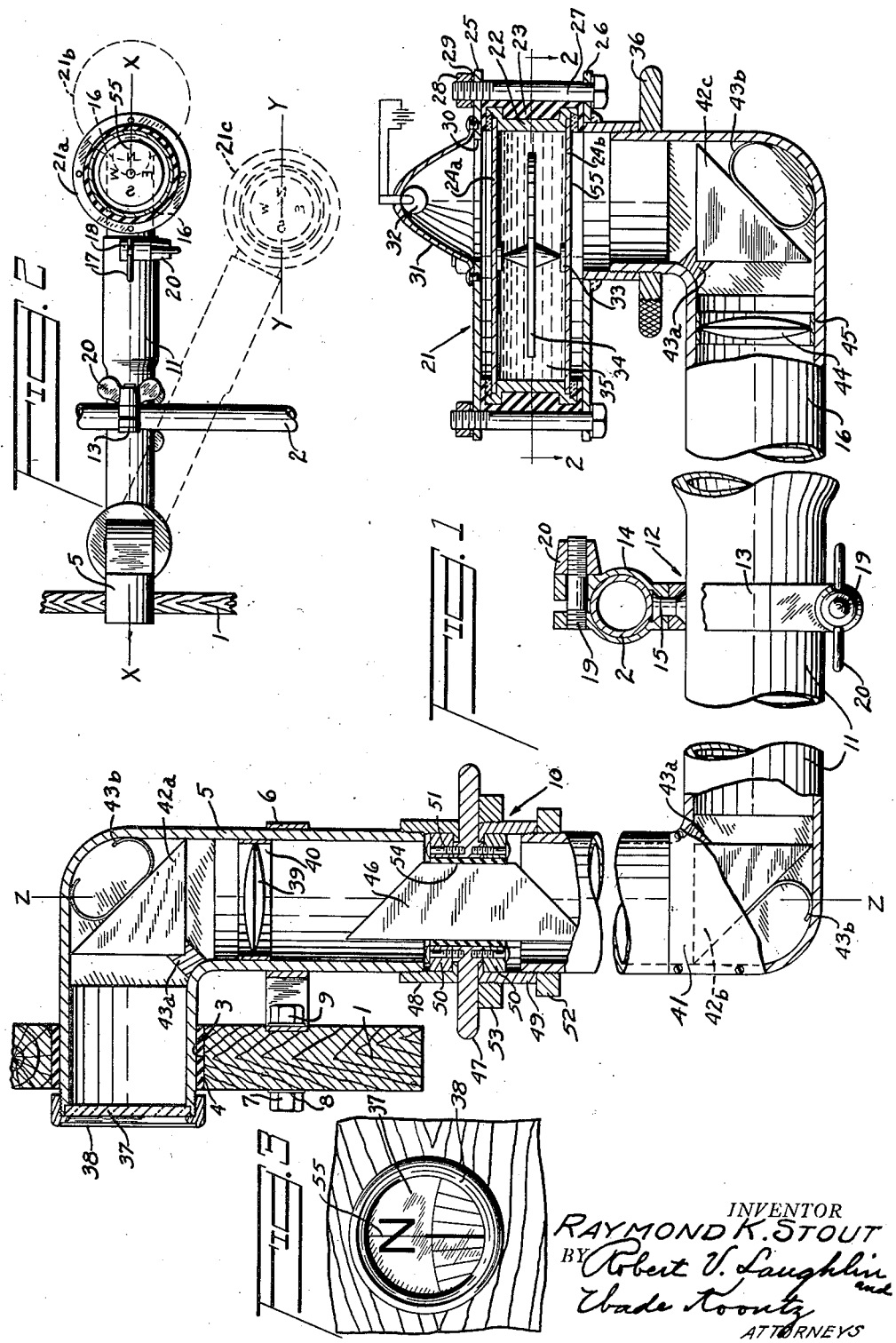
INVENTOR
RAYMOND K. STOUT
BY Robert V. Laughlin
and Wade Koontz
ATTORNEYS Patented June 29, 1937

2,085,050

UNITED STATES PATENT OFFICE 2,085,050

IMPROVED COMPASS MOUNT

Raymond K. Stout, Dayton, Ohio

Application June 23, 1936, Serial No. 86,796

5 Claims. (Cl. 88—1)

(Granted under the act of March 3, 1883, as amended April 30, 1928; 370 O. G. 757)

REISSUED

The invention described herein may be manufactured and used by or for the Government for governmental purposes, without the payment to me of any royalty thereon.

The present invention relates to readily adjustable mounts whereby magnetic compasses may be bodily shifted within an aircraft or small watercraft for the purpose of correcting compass card deviations.

The principal object of the invention is to provide a simplified mechanism for obtaining the result above-mentioned.

Another object is to provide a mount which will require a minimum of verbal or written instructions as to card deviation correction following the positioning of an aircraft or watercraft on swinging base or table.

A still further object is to provide a mechanism which may be readily secured against accidental disturbance, following its adjustment on the aforesaid swinging base or table.

With the foregoing and other objects in view which will appear as the description proceeds, the invention consists of certain new and novel features and combinations which will be hereinafter more fully illustrated and described in the accompanying drawing and more particularly pointed out in the appended claims.

Referring to the drawing, in which numerals of like character designate similar parts throughout the several claims:

Fig. 1 is a side view of the invention in partial cross-section.

Fig. 2 is a plan view of the invention in reduced scale and in partial cross-section.

Fig. 3 shows the compass viewing end of the invention.

In Figs. 1 and 2, an instrument panel 1 and a brace tube 2 form part of the fixed structure of any vehicle to which it is desired to apply my invention. The panel 1 is provided with a hole 3 and a resilient ring 4 for mounting an inverted L-shaped housing 5 by means of a bracket 6, bolts 7, washers 8, and nuts 9. A coupling 10, provided for connection of the lower portion of the L-shaped housing 5 to the upper portion of a horizontally disposed L-shaped housing 11, is freely manually rotatable with respect to both housings. The mid-horizontal portion of the housing 11 and the central portion of the braced tube 2 are rendered readily adjustable with respect to one another by means of a clamp assembly 12. The latter assembly consists of a clamping member 13, pivotally secured to a second clamping member 14 by means of a journal pin 15.

Referring to Fig. 2, the horizontal end of the housing 11 is enlarged to telescopically receive an end of a second horizontally disposed L-shaped housing 16. The enlarged end of the housing 11 is provided with a longitudinal slot 17 and bosses 18. The members 13 and 14, as well as the bosses 18, are provided with studs 19 and wing-nuts 20.

Returning to Fig. 1, the upper portion of the L-shaped housing 16 is rotatably secured to a compass bowl 21. The bowl 21 is composed of an inner housing 22, an outer housing 23, cover glasses 24a and 24b, an upper cover plate 25, a lower cover plate 26, bolts 27, nuts 28 and lock washers 29. The upper cover plate 25 is provided with an opening 30, sealed by a dome 31 provided with a light source 32. Journals 33 are provided upon the inner surfaces of the cover glasses 24a and 24b for mounting a translucent compass card 34, immersed in a dampening liquid 35. A locking disc 36 provides fixity between the lower cover plate 26 and the upper portion of the L-shaped housing 16, following desired rotational adjustment.

The upper extremity of the L-shaped housing 5 forms the "viewing end" of my invention and is provided with a field lens or ground glass 37, a retaining collar 38, an image forming lens 39 and a retaining sleeve 40. The three elbow portions of the housings 5, 11 and 16 are provided with cover plates 41 (as shown for housing 11) to permit installation therewithin of optical prisms 42a, 42b, and 42c, retaining seats 43a and retaining springs 43b. The prism 42c acts as an "objective prism" for a second image forming lens 44 secured in the L-shaped housing 16 by means of a retaining sleeve 45. The upper extremity of the L-shaped housing 16 forms the "objective end" of my invention.

Referring to Figs. 1 and 2, the coupling 10 performs a two-fold function. First, it permits relative rotation of the L-shaped housings 5 and 11 about their common vertical axis z—z. Secondly, it permits internal rotational adjustment of a rotating prism 46, about the axis z—z, without disturbing prearranged and fixed adjustment of the aforesaid L-shaped housings 5 and 11. The coupling 10 comprises a shouldered adjusting disc 47, internally flanged collars 48 and 49, lock washers 50 and screws 51, the latter parts being utilized for holding the disc 47 and collars 48 and 49 in assembled relation. A lock-nut 52 is used to prevent movement between the L-shaped housing 11 and the internally flanged collar 49. In like manner a lock-nut 53 is used to prevent movement between the internally flanged collar 49 and the adjusting disc 47. Thus, combined tightening of the lock-nuts 52 and 53 effects fixity of the rotating prism 46 with respect to the L-shaped housing 11. It should be noted that the prism 46 is fixed to the coupling 10 by means of a resilient ring 54. Further, while a lubber line 55 might equally well be inscribed upon the glass 37, the prisms 42a through 42c, or the lenses 39 and 44, the same is positioned upon the under surface of the lower cover glass 24, as shown in Figs. 1 and 2.

Adjustment of my invention is accomplished as follows. In the plan of Fig. 2, $x$—$x$ represents an axis parallel to or coincident with the longitudinal axis of any vehicle. It is well known to those skilled in the art that compass lubber lines must at all times be maintained in predetermined longitudinal alignment with reference to the vehicle axes within which they are installed. For the purpose of simplifying explanation, the plan longitudinal axes of the L-shaped housings 5, 11 and 16, as well as the lubber line 55 of Fig. 2, are shown in coincidence with a longitudinal axis of reference $x$—$x$. The compass bowl is shown in position 21a. By loosening the wing-nut 20 seated upon the near lug 18, the bowl may be extended along the axis $x$—$x$ into varying positions up to and including position 21b. The bowl 21 is fixed against longitudinal movement by retightening of the wing-nut 20 against the near lug 18. The letters, numerals and scale markings of the translucent compass card 34 are read from the under surface of the card and for that reason are so disposed that normal right-side-up images thereof are obtained in the field lens or ground glass 37 of Fig. 3 with the housings-bowl disposition of Fig. 2.

Let it next be assumed that a vehicle containing my invention is headed due north upon a swinging base or table and that the compass card 34 is found to deviate to left or right of the lubber line 55 shown in Fig. 3, due to disturbing forces set up within the structure of the aforesaid vehicle, when the housings-bowl disposition of Fig. 2 is maintained. By loosening the wing-nuts 20 of the clamping members 13 and 14 and the lock-nuts 52 and 53 of the coupling 10, it is possible to swing the combined L-shaped housings 11 and 16 about the vertical axis $z$—$z$ from 40 to 60 degrees either side of the longitudinal axis $x$—$x$, depending upon fore-and-aft spacing of the panel 1 and the brace tube 2. If the locking disc 36 be simultaneously loosened and the longitudinal axis $y$—$y$ (through lubber line 55) of the compass bowl 21 be maintained at all times parallel to the axis $x$—$x$ of Fig. 2, a position may be found in which the compass card will no longer deviate to left or right of the lubber line 55. Upon attainment of "no deviation", the locking disc 36 and aforesaid wing-nuts 20 are tightened, fixing the L-shaped housings 11 and 16 and the compass bowl 21 with respect to the vertical axis $z$—$z$. It is then a simple matter to regulate the adjusting disc 47 such that "image canting" which would otherwise appear in Fig. 3 and which is always present in azimuth adjustment of any periscopic type optical system, is entirely eliminated. Stated in simple proportional form, if for each ten degrees of clockwise or counter-clockwise deviation of the L-shaped housings 11 and 16 from the longitudinal axis $x$—$x$, a like five degrees of clockwise or counter-clockwise deviation of the adjusting disc 47 is observed with respect to the longitudinal axis $x$—$x$, no "image canting" will be observed in the field lens or ground glass 37 of Fig. 3.

Having described the invention, it will be obvious to those skilled in the art that the construction shown and described is subject to changes, alterations and modifications. I am fully aware of this and it is to be understood that the specific construction shown in the accompanying drawing is merely illustrative of the present preferred embodiment of my invention and that I consider myself entitled to all such changes and modifications as may fall within the purview and limit of the appended claims.

What I claim is:

1. A remotely reading magnetic compass comprising, in combination, a periscopic type optical system including a fixed viewing portion and a movable objective portion, means for adjusting the position of said movable portion in azimuth, and a magnetic compass carried by and adjustable about an axis parallel to but remotely located from the axis of rotation of said movable portion, said compass including a card having an illuminated indicia portion arranged in the field of said optical system.

2. A remotely reading magnetic compass including, in combination, a periscopic type optical system including a fixed viewing portion and a movable objective portion, means for adjusting the position of said movable portion in azimuth, further means for varying the length of said movable portion, and a magnetic compass carried by and adjustable about an axis parallel to the axis of rotation of said movable portion, said compass including a card having an illuminated indicia portion arranged in the field of said optical system.

3. A remotely reading magnetic compass comprising, in combination, a periscopic type optical system including a fixed viewing portion and a movable objective portion, means for adjusting the position of said movable portion in azimuth, further means for varying the length of said movable portion, and a magnetic compass card carried by and adjustable about an axis parallel to the axis of rotation of said movable portion, said compass including a card pivotally mounted about an axis eccentric with respect to the optical axis of said objective end and having an illuminated indicia portion disposed in the field of said objective end.

4. A remotely reading magnetic compass comprising, in combination, a periscopic type optical system including a fixed viewing portion and a movable objective portion, means for adjusting the position of said movable portion in azimuth, further means for varying the length of said movable portion, a magnetic compass carried by and adjustable about an axis parallel to the axis of rotation of said movable portion, said compass including a card pivotally mounted about an axis eccentric with respect to the optical axis of said objective end and having its indicia positioned for registration with said objective end, and means for illuminating an indicia portion of said card.

5. A remotely reading magnetic compass comprising, in combination, a periscopic type optical system including a fixed viewing portion and a movable objective portion, means for adjusting the position of said movable portion in azimuth, further means for varying the length of said movable portion, a magnetic compass carried by and adjustable about an axis parallel to the axis of rotation of said movable portion, said compass including a card pivotally mounted about an axis eccentric with respect to the optical axis of said objective end and having a translucent illuminated indicia portion positioned for registration with said objective end, and means for illuminating a portion of said card indicia by direct lighting means.

RAYMOND K. STOUT.